Jan 6, 1931.  C. HEDDON ET AL  1,787,726
FISH LURE
Filed Feb. 15, 1929
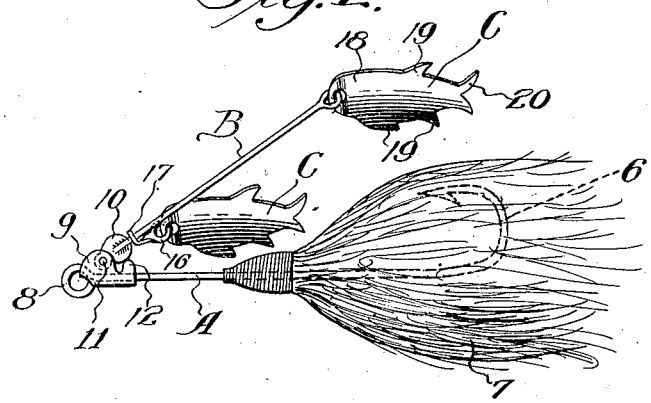
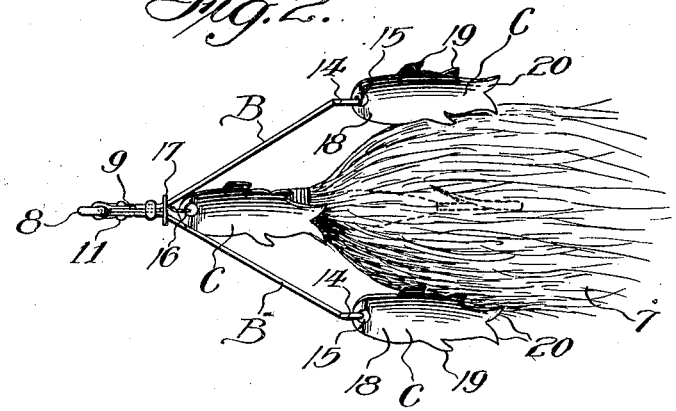
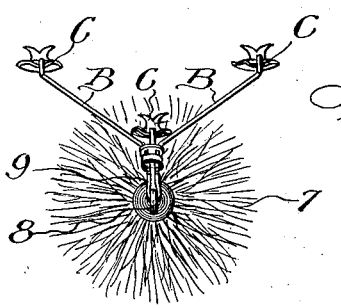
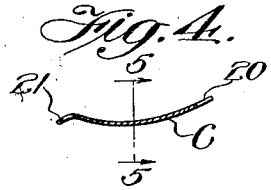
Inventors:
Charles Heddon,
Jack T. Welch.
By Munning & Munning
Attys.

Patented Jan. 6, 1931

1,787,726

UNITED STATES PATENT OFFICE

CHARLES HEDDON AND JACK T. WELCH, OF DOWAGIAC, MICHIGAN, ASSIGNORS TO JAMES HEDDON'S SONS, OF DOWAGIAC, MICHIGAN, A CORPORATION OF MICHIGAN

FISH LURE

Application filed February 15, 1929. Serial No. 340,034.

This invention relates to a fish lure such as is adapted to be used for casting or trolling. It is equipped with a plurality of metal minnows which, besides serving as a guard for the hook, impart to the bait as a whole a peculiar movement as it is retrieved through the water.

A suggestive embodiment of our invention is set forth in the accompanying drawing wherein—

Figure 1 is a side elevation of the lure;

Fig. 2 is a top plan view thereof;

Fig. 3 is a front elevation thereof;

Fig. 4 is a longitudinal section through one of the metal minnows; and

Fig. 5 is a transverse section therethrough on line 5—5 of Fig. 4.

The lure comprises two major parts—a shank A which terminates at its rear end in a hook 6 and a pair of diverging arms B which are joined together and to the shank at the forward end thereof. The shank may be equipped with a bucktail 7, as shown, although such a feature is entirely optional.

The front end of the shank is formed into an eye 8 to which may be attached a leader or line (not shown). The connection between the shank and the diverging arms B is pivotal, and for this purpose I provide a clip 9, preferably of sheet metal, which is bent around the shank adjacent its eye to present a pair of upstanding ears between which may be received a flat head 10 to which the arms B are joined at their forward ends. A pin 11 which traverses the ears and head provides a pivotal connection between the shank and arms, such that these parts are securely joined against relative lateral movement. The two arms which diverge in relation to each other are also maintained in a diverging plane relative to the hook shank by means of a stop shoulder 12 provided on the clip, which engages the head 10, as shown clearly in Fig. 1.

The rear end of each arm B terminates in an eye 14 which extends through an aperture 15 at the front end of a trailing plate-like fitting C which may take the form of a minnow. We prefer that such a minnow be stamped from a metal plate, although other materials differently processed would be suitable, and in using herein the term "metal minnow" we would include any material which meets satisfactorily the requirements of this invention.

Besides the two minnows which are joined to the ends of the arms B we employ a third minnow, similar to the others which is connected to an eye 16 extending rearwardly wardly from a cross bar 17 having therein two openings for receiving the arms B close to their juncture with the head 10. The effect of this arrangement is to provide mountings for three metal minnows which are maintained in symmetrical arrangement, away from the shank and hook and from each other, the two rear minnows trailing along upon opposite sides of the hook to serve as a guard therefor. The forward minnow which occupies a central position over the shank is disposed forwardly of the hook.

Each of the two arms B is relatively stiff or rigid as distinguished from a spring arm which is appreciable resilient. We rely upon this property of rigidity (relatively considered) which characterizes the arms B, together with their connection with the hook shank, to transmit thereto such darting, rocking, or swaying movements as are impelled by the action of the minnows. It is only when a fish strikes at the hook, or bait carried thereby, that these arms will be moved relative to the hook, and then only a swinging movement around the pivot 11.

The construction and behavior of the metal minnows C is of special interest. They are preferably of thin character with a peripheral contour resembling that of a live minnow. This is accomplished by providing a forward portion 18 resembling a head, the opposite edge portions rearwardly thereof having protuberances 19 resembling fins and a tail portion 20, all as shown clearly in the several figures of the drawing. In addition, each of these metal minnows which is concave in cross section is curved from front to back (see Fig. 4) and at its front edge is provided with an opposite bend 21 which coacts in imparting thereto a darting movement. The minnows so formed, because of their loose connection with the arms B, tend both to sway and oscillate about their mountings. It will be noted furthermore that each minnow is loosely though not rotatably mounted, thus giving full expression to the development of swaying or oscillating movements, and by this means we avoid the setting up of any gyroscopic force the tendency of which is to stabilize the bait in its travel.

When casting the present lure, the pivoted arms will swing back away from the hook to assume a trailing position during the casting movement. The metal minnows will also swing around to a similar trailing position during the cast. Due to the fact that both the arms and minnows take up like trailing positions on the cast, the one avoids fouling or interference with the other. Because of this capacity to swing freely to the rear, the minnows will trail with a minimum of atmospheric resistance, thus conducing to greater acuracy and distance in casting of the lure. It will also be noted that the minnows in all positions are offset with respect to the line of draft of the bait body so as to have freedom for oscillating or swimming, a degree of such movements being transmitted therefrom to the bait in its entirety.

When the present lure is drawn through the water, the several metal minnows will be agitated to oscillate actively, thereby presenting an attraction to the fish. The attractiveness of the lure is enhanced by the resemblance of the metal minnows to a small school of live minnows. In addition the movements of the metal minnows which oscillate more or less in unison will react on the bait as a whole to set up a swaying or sidewise rocking movement. The reactive forces of each metal minnow are amplified by those proceeding from the others, so that these several minows control and determine the character and kind of movements which are imparted to the bait in its entirety.

We claim:

1. In a bait, the combination of a hook, a draft connection extending from the hook to a line, and a fitting attached oscillatably to said connection at a point outside the line of draft to transmit a degree of its own movement to the draft connection.

2. In a bait, the combination of a hook from which extends a draft connection to a line, means extending laterally from said connection to a point beyond the draft line thereof, and a fitting flexibly attached to said lateral means outside the draft line, the fitting being connected to oscillate thereon and transmit a degree of its movement to the bait in its entirety.

3. A fish lure comprising a hook having a shank to which is connected a pair of relatively rigid diverging arms, and plate-like fittings loosely connected to said arms for limited oscillatory movement, whereby oscillating and swaying movements are imparted to the lure by the reactive forces of the fitting through said arms.

4. A fish lure comprising a hook having a shank, a pair of relatively rigid arms connected to the forward end of said shank for limited swinging movement in a single plane, and plate-like fittings oscillatably connected to said arms and to impart movement to said lure through the medium of said arms and at angles to the swinging movement of said arms.

5. A fish lure comprising a hook having a shank to which is connected a pair of relatively rigid diverging arms which terminate in eyes, and plate-like fittings loosely linked to said eyes for limited oscillatory movement relative thereto, the movements of which react through said arms to impart oscillating and darting movements to said lure.

6. A fish lure comprising a hook having a shank to the forward end of which is pivotally connected a pair of relatively rigid arms extending symmetrically on either side of said hook, plate-like fittings loosely connected to said arms for limited oscillatory movement, and a plate-like fitting oscillatably mounted between the arms adjacent the forward ends thereof, whereby movement is imparted to the lure by the fittings through said arms.

7. A fish lure which comprises a hook having a shank to which is joined for pivotal movement in a single plane a pair of diverging arms between which is a cross bar, plate-like fittings having oscillatable mountings on the cross bar and at the free ends of the diverging arms to transmit therethrough reactive forces to oscillate and sway the lure.

8. In a bait, the combination of a plate-like fitting, a pivoted mounting therefor permitting the fitting to swing and trail free of interference with the bait during both casting and retrieving movements, and means oscillatably connecting said fitting with said mounting, whereby on retrieving movement of the bait oscillating movement is transmitted from said fitting to said bait.

In testimony whereof, we have hereunto set our hands this 11th day of February, 1929.

CHARLES HEDDON.
J. T. WELCH.